(12) United States Patent
Lovell et al.

(10) Patent No.: US 8,783,355 B2
(45) Date of Patent: Jul. 22, 2014

(54) VIRTUAL FLOWMETER FOR A WELL

(75) Inventors: John R. Lovell, Houston, TX (US); Valery Shako, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 436 days.

(21) Appl. No.: 12/967,605

(22) Filed: Dec. 14, 2010

(65) Prior Publication Data

US 2011/0226469 A1  Sep. 22, 2011

Related U.S. Application Data

(60) Provisional application No. 61/306,671, filed on Feb. 22, 2010.

(51) Int. Cl.
*E21B 36/00* (2006.01)
*E21B 47/06* (2012.01)

(52) U.S. Cl.
USPC .............. 166/302; 166/250.01; 73/152.33

(58) Field of Classification Search
USPC ............... 166/302, 250.01; 73/152.33
See application file for complete search history.

(56) References Cited

U.S. PATENT DOCUMENTS

| | | | |
|---|---|---|---|
| 4,520,666 A | 6/1985 | Coblentz et al. | |
| 5,014,553 A | 5/1991 | Hori et al. | |
| 6,240,787 B1 | 6/2001 | Alexander | |
| 6,446,504 B1 | 9/2002 | Maginnis, Jr. | |
| 6,585,408 B2 | 7/2003 | El-gabry et al. | |
| 6,618,677 B1 | 9/2003 | Brown | |
| 6,769,805 B2 | 8/2004 | Williams et al. | |
| 6,920,395 B2 | 7/2005 | Brown | |
| 7,165,618 B2 | 1/2007 | Brockman et al. | |
| 7,249,636 B2 | 7/2007 | Ohmer | |
| 7,352,166 B1 | 4/2008 | Blom | |
| 7,412,881 B2 * | 8/2008 | Crawley et al. | ............ 73/204.11 |
| 7,419,002 B2 | 9/2008 | Dybevik et al. | |
| 7,526,407 B2 | 4/2009 | Bringedal et al. | |
| 7,580,797 B2 | 8/2009 | Akram et al. | |
| 7,735,555 B2 | 6/2010 | Patel et al. | |
| 7,836,959 B2 | 11/2010 | Howard et al. | |

(Continued)

FOREIGN PATENT DOCUMENTS

| | | |
|---|---|---|
| GB | 2401430 | 9/2005 |
| GB | 2408327 | 9/2005 |

(Continued)

OTHER PUBLICATIONS

SPE 125047. Subsea Deployment of Instrumented Sand Screens in High-Rate Gas Wells. G. Somaschini, SPE, J. Lovell, SPE, H. Abdullah, SPE, B. Chariyev, P. Singh, and F. Arachman, SPE, Schlumberger.2009 SPE Annual Technical Conference and Exhibition held in New Orleans, Louisiana, USA, Oct. 4-7, 2009.

(Continued)

*Primary Examiner* — Giovanna Wright
(74) *Attorney, Agent, or Firm* — David J. Groesbeck; Brandon S. Clark

(57) ABSTRACT

A technique includes inducing a distributed temperature change along a portion of a wellbore and measuring a time varying temperature along the portion of the wellbore due to the induced change. The technique includes determining a distributed flow rate in the portion based at least in part on the measured time varying temperature before the temperature reaches equilibrium.

25 Claims, 5 Drawing Sheets

(56) References Cited

U.S. PATENT DOCUMENTS

| | | | |
|---|---|---|---|
| 2005/0149264 A1 | 7/2005 | Tarvin et al. | |
| 2006/0278399 A1 | 12/2006 | Dwivedi et al. | |
| 2007/0213963 A1* | 9/2007 | Jalali et al. | 703/10 |
| 2007/0227727 A1 | 10/2007 | Patel et al. | |
| 2008/0023196 A1 | 1/2008 | Crawley et al. | |
| 2008/0185144 A1 | 8/2008 | Lovell | |
| 2008/0201080 A1 | 8/2008 | Lovell et al. | |
| 2009/0037113 A1 | 2/2009 | Akram et al. | |
| 2009/0173494 A1 | 7/2009 | Tarvin et al. | |
| 2009/0182509 A1 | 7/2009 | Kimminau et al. | |
| 2009/0216456 A1 | 8/2009 | Poe, Jr. | |
| 2011/0010096 A1 | 1/2011 | Lovell et al. | |

FOREIGN PATENT DOCUMENTS

| | | |
|---|---|---|
| WO | 9850680 | 11/1998 |
| WO | 2005035943 | 4/2005 |
| WO | 2005064116 | 7/2005 |
| WO | 2006010875 | 2/2006 |
| WO | 2008016876 | 2/2008 |

OTHER PUBLICATIONS

SPE116476.Sensor Architecture for Open Hole Gravel Pack Completions.H.S. Gambhir, Reliance Industries Ltd.; A. Shrivastav, Bechtel O & G; J. Lovell, SPE, S.Mackay, SPE, C. Chouzenoux, SPE, B. Juchereau, SPE, F. Arachman, SPE, and A. Chaudhary, SPE, Schlumberger. 2008 SPE Annual Technical Conference and Exhibition held in Denver, Colorado, USA, Sep. 21-24, 2008.

H. Spath "Fitting data to one exponential", communications of the ACM, vol. 13, Issue 2, 1970.

Kundu, D. (1993). Estimating the parameters of undamped exponential signals. Technometrics, 35, 215-218.

Yamada, S.E., "A Transient Technique for In-situ Thermal Property Measurements," Int. J. Rock Mech. Min. Sci. & Geomech. Abstr. 1982, vol. 19, pp. 149-152.

SPE 124388. Modeling Analysis of Sand-Screen Collapse Resistance Under Geotectonic Load. Giin-Fa Fuh, Nobuo Morita and Kenji Furui, SPE ConocoPhillips Company and Waseda University. 2009 SPE Annual Technical Conference and Exhibition held in New Orleans, Louisiana, U.S.A., Oct. 4-7, 2009.

SPE 107268.Placement of Permanent Downhole Pressure Sensors in Reservoir Surveillance. B.Izgec, SPE, Chevron ETC and Texas A&M U.; M.E. Cribbs, SPE, Chevron North America & Exploration; S.V. Pace, SPE, Chevron ETC; D. Zhu, SPE, Texas A&M U.; and C.S. Kabir, SPE, Chevron ETC. SPE EuropeclEAGE Annual Conference and Exhibition held in London, United Kingdom, Jun. 11-14, 2007.

SPE 116474. Completion Design for Sandface Monitoring of Subsea Wells. S. Mackay, SPE, J. Lovell, SPE, D. Patel, SPE, F. Cens, SPE, and S. Escanero, SPE, Schlumberger. 2008 SPE Annual Technical Conference and Exhibition held in Denver, Colorado, USA, Sep. 21-24, 2008.

SPE 120817. First High Pressure and High Temperature Digital Electric Intellitite Welded Permanent Down Hole Monitoring System for Gas Wells. Muhammad Shafiq, SPE, Schlumberger; Omar Al-Faraj, Adnan A. Al-Kanaan, and Bandar H. Al-Malki, Saudi Aramco. 2008 SPE Saudi Arabia Section Technical Symposium held in Alkobar, Saudi Arabia, May 10-12, 2008.

SPE 95656. A Comprehensive Model of Temperature Behavior in a Horizontal Well. K. Yoshioka, D. Zhu, and A.D. Hill, Texas A&M U., and P. Dawkrajai and L.W. Lake, U. of Texas at Austin. 2005 SPE Annual Technical Conference and Exhibition held in Dallas, Texas, U.S.A., Oct. 9-12, 2005.

PCSFerguson presentation, "Opti-Flow(TM) Gas Lift for Long, Perforated Wells," 32 pages.

* cited by examiner

VIRTUAL FLOWMETER FOR A WELL

This application claims the benefit under 35 U.S.C. §119(e) to U.S. Provisional Patent Application Ser. No. 61/306,671 entitled, "VIRTUAL FLOWMETER USING DISTRIBUTED TRANSIENT TEMPERATURE MEASUREMENTS," which was filed on Feb. 22, 2010, and is hereby incorporated by reference in its entirety.

BACKGROUND

The invention generally relates to a virtual flowmeter for a well.

A typical completed well includes a variety of downhole sensors that acquire data indicative of reservoir properties, flow configurations, geomechanical properties, etc. A distributed temperature sensor is one such sensor. The distributed temperature sensor, which may involve electrical and/or optical technologies acquires a spatially distributed temperature profile over a particular region of interest of the well. As compared to individual or discrete sensors, a distributed temperature sensor-based system has traditionally provided the ability to perform a relatively wider and more comprehensive analysis of conditions downhole.

SUMMARY

In an embodiment of the invention, a technique includes inducing a distributed temperature change along a portion of a wellbore and measuring a time varying temperature along the portion of the wellbore due to the inducing. The technique includes determining a distributed flow rate in the portion based at least in part on the measured time varying temperature before the temperature reaches equilibrium.

In another embodiment of the invention, a system includes a distributed temperature sensing system and a processing system. The processing system receives data from the distributed temperature sensor indicative of a time varying temperature along the portion of the wellbore due to an induced distributed temperature change. The processing system determines a distributed flow rate in the portion based at least in part on the time varying temperature before the temperature reaches equilibrium.

Advantages and other features of the invention will become apparent from the following drawing, description and claims.

DETAILED DESCRIPTION

In the following description, numerous details are set forth to provide an understanding of some illustrative embodiments of the present invention. However, it will be understood by those skilled in the art that various embodiments of the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Systems and techniques are disclosed herein for purposes of constructing a virtual flowmeter for a well based on distributed transient temperature measurements. More specifically, in accordance with embodiments of the invention described herein, a distributed temperature sensing (DTS) sensor, which includes at least one optical fiber, is deployed downhole to traverse a particular region of interest for purposes of acquiring spatially distributed temperature measurements in the region of interest. A pressure perturbation is introduced into the well, which induces a temperature change in the region of interest; and as described below, data provided by the DTS sensor indicative of the resulting time varying temperature measurements are processed for purposes of determining a distributed flow rate in the region of interest.

Figure 1:
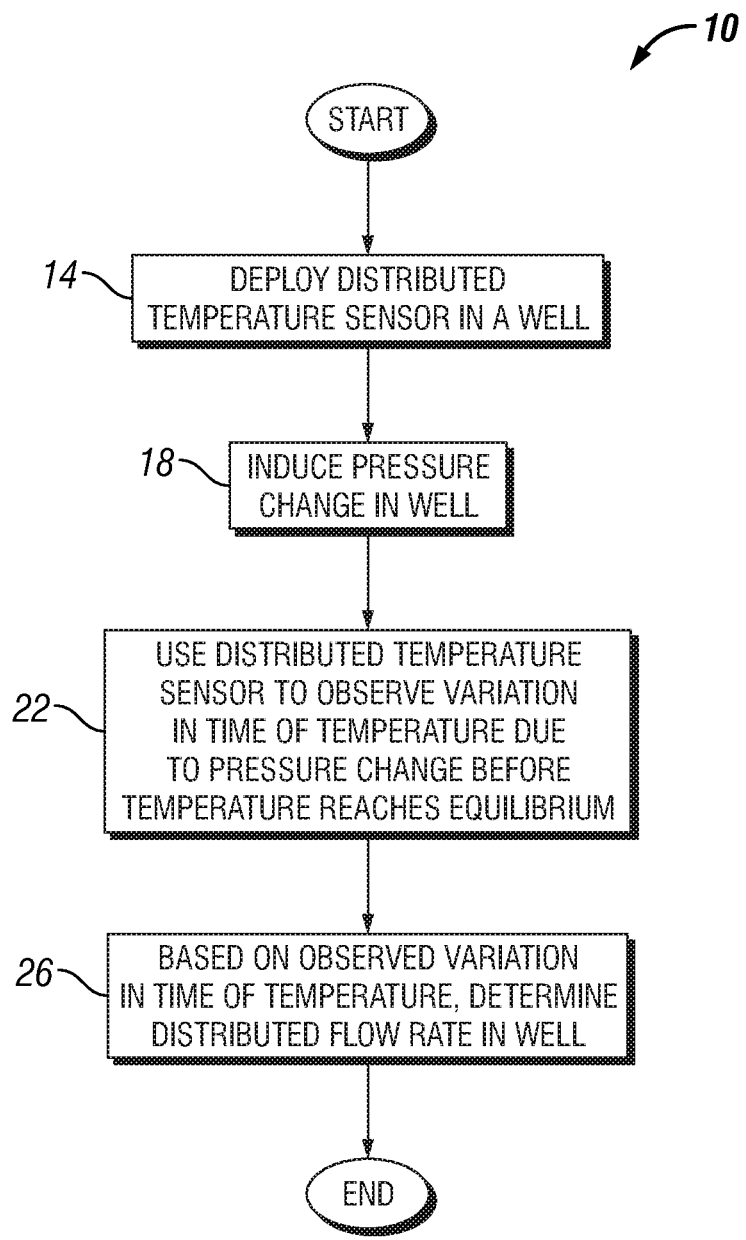
FIGS. 1 and 3 are flow diagrams depicting techniques to determine a distributed flow rate in a well according to embodiments of the invention.

Referring to FIG. 1, thus, in accordance with embodiments of the invention described herein, a technique 10 includes deploying (block 14) a distributed temperature sensor in a well and inducing (block 18) a pressure change in the well. The distributed temperature sensor is used to observe a variation in time of temperature due to the pressure change before the temperature reaches equilibrium, pursuant to block 22. Based on the observed variation in time of the temperature before equilibrium, a distributed flow rate in the well is determined, pursuant to block 26.

Figure 2:
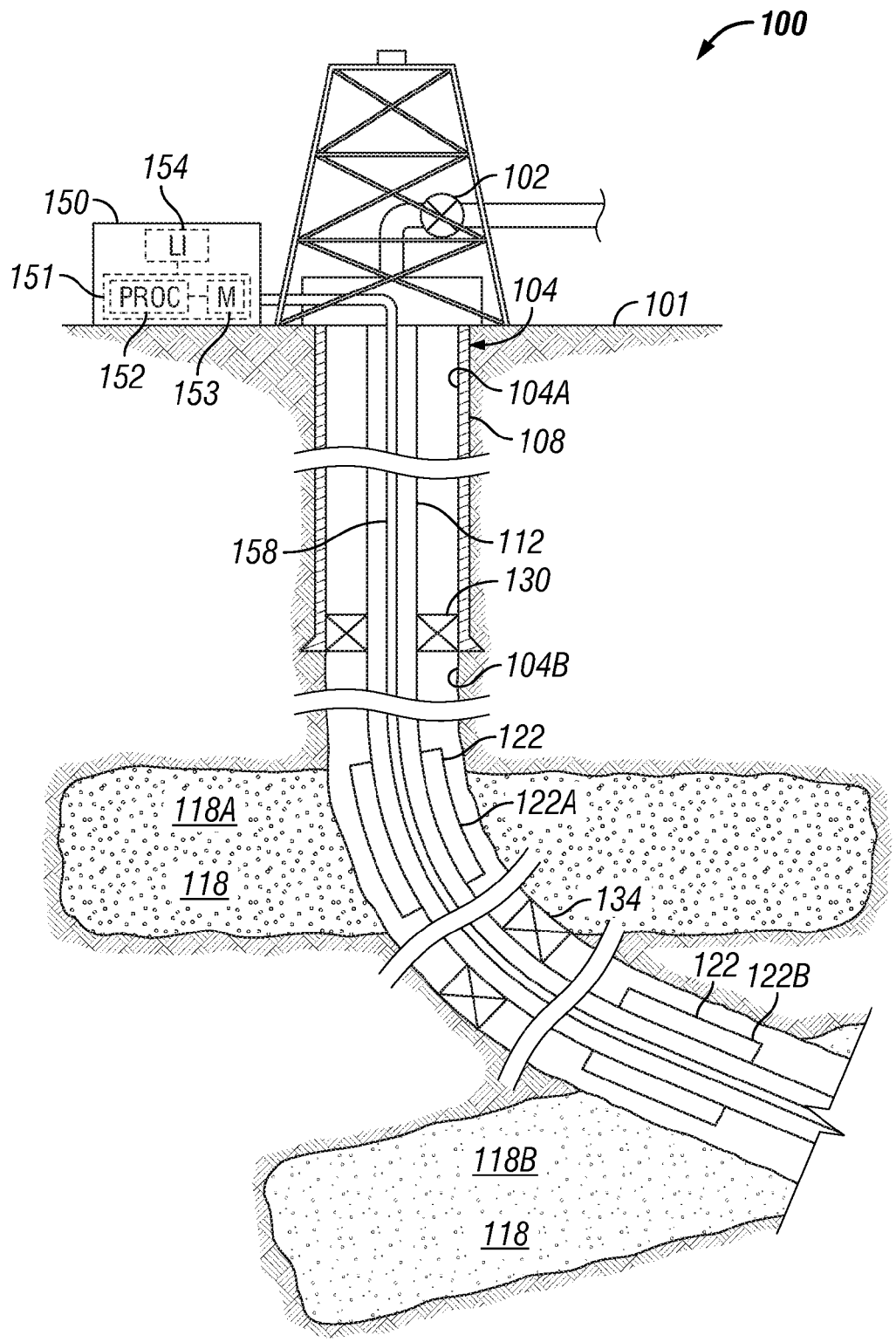
FIGS. 2 and 5 are schematic diagrams of wells according to embodiments of the invention.

As a more specific example, FIG. 2 depicts an exemplary well 100, which includes a DTS-based system for purposes of measuring a spatially distributed temperature profile along a region of interest of the well 100. In this regard, in accordance with some embodiments of the invention, the well 100 includes a wellbore 108, which may include a cased portion 104a (lined and supported by a casing 108) and an uncased portion 104b that extends downhole from the cased portion 104a. The above-mentioned DTS-based measurement system includes a surface-disposed laser interrogation and processing workstation 150 (herein called the "workstation 150") and an optical fiber 158 that is optically coupled to the workstation 150. The optical fiber 158 extends down into the well 100 and extends through one or more regions of interest, as further described below. It is noted that the optical fiber 158 may be disposed inside a relatively small diameter conduit, which may be filled with an inert gas, for example.

The DTS system may use another type of distributed temperature sensor in other embodiments of the invention; or alternatively, in accordance with other implementations, spatially distributed downhole temperature measurements may be acquired using another type of sensor system, such as an array of discrete pressure sensors, for example.

In this regard, a series of high-resolution temperature sensors may be deployed along the sandface of an openhole completion to form a distributed temperature array. These sensors may have an associated accuracy and resolution that equals or exceeds the accuracies of fiber optic distributed temperature measurements. Stable, high-resolution digital measurements may be made using such sensors in combination with a ratiometric circuit. The resulting apparatus, for example, may have a resolution of about 1 mdegC when sampled every minute. Sampling over a longer interval may result in a still higher resolution.

The temperature sensor system may also be deployed into other completion configurations whether or not the sandface is cased. For applications where the wellbore is to be perforated, the sensor system may be oriented with respect to some internal key that is subsequently used to orient the perforating guns away from the area containing the sensors. For deployment into an open hole wellbore, the sensor system may be clamped and protected while running in, as well as being well thermally grounded to the completion through the use of gold-coated sleeves, for example. The sensor system may be placed in the vicinity of inflow-control devices where the sensor system may measure the temperature of the completion downstream of the incoming fluid. The sensor system may also be deployed in the vicinity of active flow control valves. In some embodiments, the sensors may be deployed exterior to the completion, or deployed into the interior of the completion. In the later case the sensors may be permanently installed (such as located along a stinger or dip-tube placed into the wellbore) or temporarily installed (for example deployed as part of a slickline or coiled tubing intervention.

For rapid deployment in rigs with a high data rate, the sensor system may include temperature sensors that are assembled into a spoolable array with the spacing largely determined before the spool is transmitted to the rig. Assembly and use of such arrays has been disclosed, for example, in U.S. patent application Ser. No. 11/767,908, entitled, "PROVIDING A SENSOR ARRAY," which was filed on Jun. 25, 2007, and is incorporated herein by reference. The spoolable array might be further adjustable on the rig through the use of rig splicing and welding apparatus, for example, such as through the use of known technologies such as the Intellite family of connectors provided by Schlumberger. The spoolable array may also be deployed in combination with swellable packers.

The sensor array data may be passed along a multi-staged completion through the use of one or more inductive couplers, for example. However, inductive coupling may not be used, in accordance with other embodiments of the invention.

Regardless of the form of the temperature sensor system, the sensor system is activated after completion of the wellbore.

For the exemplary well 100 of FIG. 2, the DTS-based system includes the optical fiber 158 that extends downhole along a production tubing string, herein called the "production tubing 112." As a non-limiting example, the optical fiber 158 may be attached to the outer surface of the production tubing 112 for purposes of obtaining various distributed temperature measurements along the length of the production tubing 112. More specifically, in accordance with some embodiments of the invention, the production tubing 112 and optical fiber 158 extend through various production zones 118 (zones 118a and 118b, being depicted as non-limiting examples), which extend through corresponding formations. As an example, each of the production zones 118 form a corresponding region of interest for which a set of spatially distributed temperature measurements is acquired and a corresponding spatially distributed flow rate is determined.

As an example, the upper production zone 118a may be an isolated zone that is formed between an upper packer 130 that forms an annular seal between the exterior surface of the production string 112 and the interior surface of the casing 108, and a lower packer 134 that forms an annular seal between the exterior surface of the production string 112 and the uncased wellbore wall. The production zone 118b may be formed, for example, below the packer 134, and another packer (not shown in FIG. 2) may be disposed on the lower end of the production zone 118b.

In accordance with some embodiments of the invention, each production zone 118 is associated with various production/completion equipment 122 (equipment 122a and 122b, being depicted in FIG. 2 as examples) for purposes of regulating the flow of well fluid into the central passageway of the production string 112. As examples, the equipment 122 may include various valves (sliding sleeve valves, ball valves, etc.), chokes, screens, shrouds, etc., as can be appreciated by the skilled artisan. For the specific example depicted in FIG. 2, the equipment 122 may be provided at a particular location as part of the production string 112. Although other arrangements are contemplated, such as embodiments in which the equipment 122 may be part of an outer string or casing, depending on the particular implementation.

For purposes of constructing the virtual flowmeter, the well 100 includes, in addition to the DTS system, a device to introduce temperature changes in the zones 118. One way to introduce these temperature changes is to introduce a pressure perturbation in the well 100 via a pressure changing device, such as a flow control valve or a surface-disposed wellhead valve 102. In this manner, the wellhead valve 102 may be controlled by the workstation 150 for purposes of inducing a pressure change at the wellhead to, in turn, induce pressure changes in the various regions of interest downhole in the well. For this purpose, the workstation 150 includes a controller 151 that, in general, controls operation of the valve 102 and, in general, may control the DTS system and the processing of the data gathered from the DTS system for purposes of determining a distributed flow in the well. Although the controller 151 (as part of the workstation 150) is depicted as being disposed at the well site, it is noted that this is merely an exemplary embodiment, as the controller 151 may be remotely located with respect to the well 100, may employ a distributed architecture in which remotely and/or locally disposed units coordinate the processing of the distributed flow rate, etc. Thus, many variations are contemplated and are within the scope of the appended claims.

In general, the controller 151 includes a processor 152 (a computer system, a microprocessor, a microcontroller, a central processing unit (CPU), one or more processing cores, etc.) which execute instructions that are stored in a memory 153 of the controller 151 for purposes of performing all or portions of the techniques that are disclosed herein, such as one or more parts of the technique 10, which is discussed above. As also shown in FIG. 2, in accordance with some implementations, the controller 151 interacts with a laser interrogator 154 for purposes of interacting with the optical fiber 158 to launch optical pulses and receive corresponding distributed temperature measurement data, in accordance with some embodiments of the invention.

In accordance with some embodiments of the invention, the controller 151 controls the operation of the wellhead valve 102 such that after the well is brought into production at a certain flow rate, the controller 151 changes the pressure at the wellhead outlet so that there is a different drawdown across the sandface (i.e., the interface at the wellbore wall in each of the zones 118). Because of the Joule-Thomson effect on the well fluid, the induced pressure change corresponds to a new inflow temperature. The inflow temperature does not, however, change instantaneously, but rather, the temperature is subject to a transient change until the temperature stabilizes at an equilibrium temperature. The temperature measurements are therefore subject to a transient temperature, which may be approximated by an exponential curve.

The time constant of the exponential is indicative of the heat-transfer coefficient of the region of the completion near that temperature measurement. The time constant may be derived, as described herein, without knowledge of the equilibrium temperature, thereby permitting relatively fast derivation of the determined flow rate. In general, the heat-transfer coefficient is dominated by two components: a conductive term, which describes the heat flow into the near wellbore zone; and a convective term, which is proportional to the mass flow rate. This latter convective term varies as the flow-rate varies, whereas the conductive term is relatively constant. Consequently, by measuring the time constant for a series of induced pressure changes (such as wellhead pressure-induced changes), the distributed flow rate in the vicinity of the temperature sensor (i.e., the optical fiber 158 in the region of interest) may be determined.

In accordance with some embodiments of the invention, the controller 151 may apply calibration coefficients to convert the determined time constant to a distributed flow rate (e.g., the variation of the heat transfer coefficient along the wellbore). These calibration constants may be determined by noting that the overall flow rate along the wellbore gives rise to the measured flow rate along the wellbore. By performing this operation on all of the temperature measurement points, the controller 151 may derive a distributed mass flow rate along a region of interest. In accordance with some embodiments of the invention, the controller 151 displays the determined distributed flow rate on a display (now shown) of the workstation 150.

When the well 100 is first brought online the acquired temperature measurements may form a near linear curve representing the geothermal gradient of the reservoir. In other cases, the wellbore may demonstrate that a temperature equilibrium state might be reached in the presence of cross-flowing zones. In gas wells that have selectively low vertical permeability, the drilled well itself might be the cause of the cross-flow, as the upper zones will have colder denser gas that can travel down the wellbore to displace warmer, lighter gas in the lower zones. In other wells, it is possible that there are different reservoir layers that have anomalous pressures, in which case again the drilling of the wellbore initiates a cross-flow.

Bringing the well 100 into production triggers a different movement of fluids in the wellbore and a corresponding change in pressure drawdown from reservoir pressure into the wellbore. Additional pressure drop may arise along the wellbore via friction drop, gravity and turbulence and kinetic energy consideration. Wellbore simulation programs to model these effects may be provided with varying layers of complexity from fairly rapid "nodal analysis" programs to more sophisticated but slower computational fluid dynamics packages. The computation of drawdown in the reservoir may be performed with different degrees of sophistication in the simulator. The wellbore and reservoir simulators may be provided for both transient and pseudo-steady state models. In many cases, the true equilibrium will not be reached but can be approximated by a pseudo-steady state formulation.

The temperature change introduced in a given zone 118 due to the pressure perturbation that is introduced by operation of the valve 102 is due to the fact that reservoir fluids change temperature as they undergo an iso-enthalpic pressure change. This is not the case for an ideal gas, but is true of real gases, as well as liquids such as water and hydrocarbons. The ratio of temperature change to pressure change under iso-enthalpic circumstances is termed the "Joule-Thomson coefficient." For a typical reservoir configuration, the Joule-Thomson coefficient of a gas is positive (i.e., a decrease in pressure leads to a decrease in temperature), whereas the Joule-Thomson coefficients of water and hydrocarbon are negative. Joule-Thomson coefficients typically vary with both temperature and pressure, and empirical relationships may be determined. Formulations may also be determined for the Joule-Thomson coefficient of a mixture (i.e., the coefficient of the mixture need not be simply the weighted average of the individual coefficients).

By measuring downhole Joule-Thomson coefficients, it is possible to make inferences of the fluid properties (e.g. to distinguish between gas and water, or between oil and water). In particular, changing the wellhead pressure changes the downhole pressure. The reservoir pressure changes relatively slowly meaning that wellhead pressure changes induce corresponding changes in the drawdown pressure and hence, changes the Joule-Thomson effect on temperature. Therefore, changing the wellhead pressure induces a temperature transient, and if the equilibrium temperature is known, or computed, then it is possible to derive flow rate. Unfortunately, it may be difficult to determine the equilibrium temperature, and it may take a relatively long time to reach that temperature. Any change in fluid properties or wellhead pressure during the intervening time results in a new equilibrium temperature. Therefore, the techniques and systems that are described herein consider the use of multiple measurements of pressure and temperature during the decay process (i.e., before equilibrium is reached) and apply a modified Prony or other similar algorithm.

Prony's Method is essentially a decomposition of a signal with M complex exponentials via the following process:
Regularly sample f(t) so that the $n^{th}$ of N samples may be written as follows:

$$F_n = \hat{f}(\Delta_t n) = \sum_{m=1}^{M} B_m e^{\lambda_m t}$$

If f(t) happens to consist of damped sinusoids then there will be pairs of complex exponentials such that $$B_a = \frac{1}{2} A_i e^{\phi_i j}$$

$$B_b = \frac{1}{2} A_i e^{-\phi_i j}$$

$$\lambda_a = \sigma_i + j\omega_i$$

$$\lambda_b = \sigma_i - j\omega_i$$

where $$B_a e^{\lambda_a t} + B_b e^{\lambda_b t} =$$

$$\frac{1}{2} A_i e^{\phi_i j} e^{(\sigma_i + j\omega_i)t} + \frac{1}{2} A_i e^{-\phi_i j} e^{(\sigma_i - j\omega_i)t} = A_i e^{\sigma_i t} \cos(\omega_i t + \phi_i)$$

Because the summation of complex exponentials is the homogeneous solution to a linear difference equation the following difference equation will exist:

$$\hat{f}(\Delta_t n) = -\sum_{m=1}^{M} \hat{f}(\Delta_t (n-m)) P_m$$

The key to Prony's Method is that the coefficients in the difference equation are related to the following polynomial $$\sum_{m=1}^{M+1} P_m x^{m-1} = \prod_{m=1}^{M} (x - e^{\lambda_m})$$

These facts lead to the following three steps to Prony's Method
1) Construct and solve the matrix equation for the $P_m$ values:

$$\begin{bmatrix} F_N \\ \vdots \\ F_{2N-1} \end{bmatrix} = - \begin{bmatrix} F_{N-1} & \cdots & F_0 \\ \vdots & \cdot & \vdots \\ F_{2N-1} & \cdots & F_{N-1} \end{bmatrix} \begin{bmatrix} P_1 \\ \vdots \\ P_M \end{bmatrix}$$

Note that if N≠M a generalized matrix inverse may be needed to find the values $P_m$
2) After finding the $P_m$ values find the roots (numerically if necessary) of the polynomial $$\sum_{m=1}^{M+1} P_m x^{m-1}$$

The $m^{th}$ root of this polynomial will be equal to $e^{\lambda_m}$.
3) With the $e^{\lambda_m}$ values the $F_n$ values are part of a system of linear equations which may be used to solve for the $B_m$ values:

$$\begin{bmatrix} F_{k_1} \\ \vdots \\ F_{k_M} \end{bmatrix} = \begin{bmatrix} (e^{\lambda_1})^{k_1} & \cdots & (e^{\lambda_M})^{k_1} \\ \vdots & \cdot & \vdots \\ (e^{\lambda_1})^{k_M} & \cdots & (e^{\lambda_M})^{k_M} \end{bmatrix} \begin{bmatrix} B_1 \\ \vdots \\ B_M \end{bmatrix}$$

where M unique values $k_i$ are used. It is possible to use a generalized matrix inverse if more than M samples are used. In the case that the pressure at the wellhead is not piecewise constant, a convolution approach may be employed, where each small variation of pressure results in an additional exponential change; and the combination overall is that the temperature transient is a convolution of the pressure against computable kernels. Modifications to the Prony method are well known in the industry, for example, the Prony technique can be stabilized through the use of Singular Value Decomposition as described in "Application of the singular valve decomposition—Prony method for analyzing deep-level transient spectroscopy capacitance transients", in Review of Scientific Instrumentation, vol 69, Issue 6, pp. 2459 by M. S. Mazzolo et al, the contents of which are hereby incorporated by reference.

Figure 4:
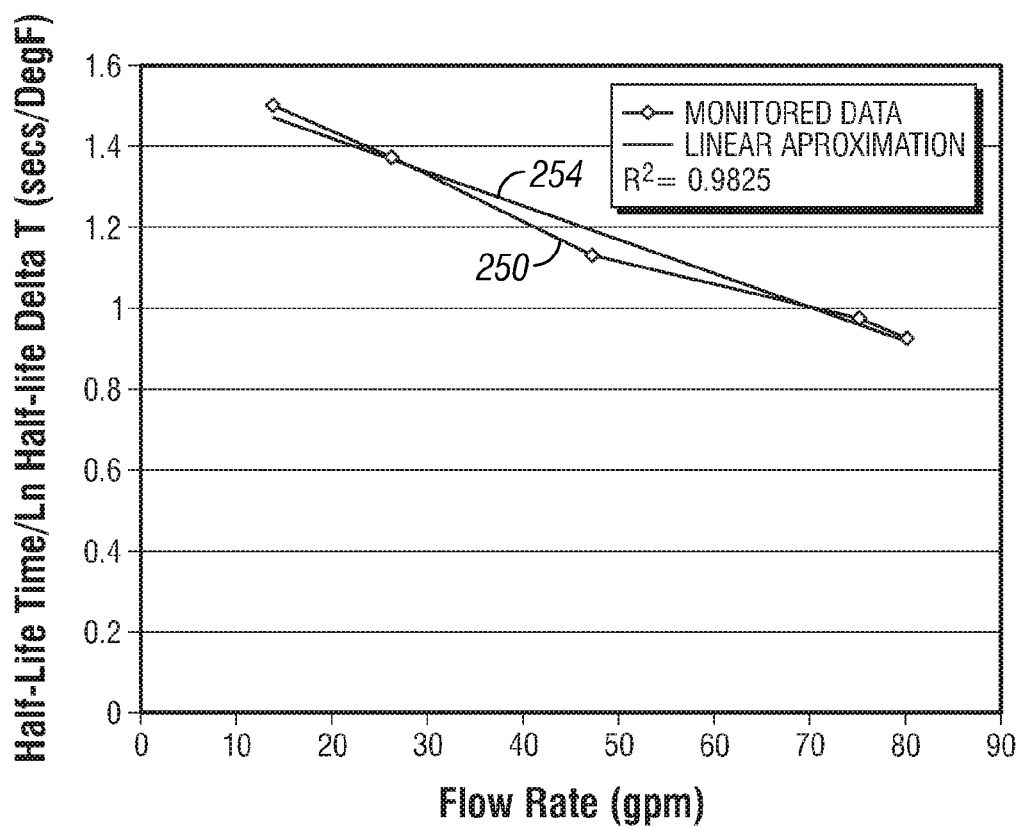
FIG. 4 depicts measured and modeled time constants versus flow rate according to embodiments of the invention.

A key aspect of the inversions is that an effective time constant may be derived without requiring waiting for a steady-state equilibrium pressure to be obtained. The temperature change along the wellbore is distributed in nature and is not caused by a local temperature sink. The flow rate in the wellbore may thus, be determined by the controller 151 by the controller 151 matching the measured temperature transients against a combined model of the wellbore and near-wellbore. Exemplary parameters that may be used in the model are as follows:

Air: $k_f=24\times10^{-3}$ Wm$^{-1}$K$^{-1}$; $\mu=18\times10^{-6}$ Nsm$^{-2}$; $\rho=1.29$ kgm$^{-3}$; c=1000 Jkg$^{-1}$K$^{-1}$ Water: $k_f=0.61$ Wm$^{-1}$K$^{-1}$; $\mu=1\times10^{-3}$ Nsm$^{-2}$; $\rho=1000$ kgm$^{-3}$; c=4000 Jkg$^{-1}$K$^{-1}$ Oil: $k_f=0.13$ Wm$^{-1}$K$^{-1}$; $\mu=2.5\times10^{-3}$ Nsm$^{-2}$ at T=25° C.; $\rho=900$ kgm$^{-3}$; c=1700 Jkg$^{-1}$K$^{-1}$ In many cases, matching the observed temperature transient to a distributed flow rate relies on additional parameters of the wellbore. For example, referring generally to FIG. 4, which depicts monitored data 250 and a linear approximation 254 to the data 250, there are two parameters required for the fit of linear approximation 254 to the data 250. In particular, the heat-transfer coefficient from the wellbore fluid to the completion may be a dominant factor in that linear approximation. This raises a complication which has not been previously known.

It is reasonable, however, to assume these coefficients vary only slowly along the wellbore. For example, if neither tubing material, tubing diameters nor the lithology exterior to the completion has significantly changed, then the heat-transfer coefficient may be assumed to change by an insufficient degree. By having a multiplicity of temperature sensors, then there are more measurements than unknowns. This allows the controller 151 to simultaneously determine heat transfer coefficients and flow rates from a multiplicity of transient measurements along the wellbore.

Figure 5:
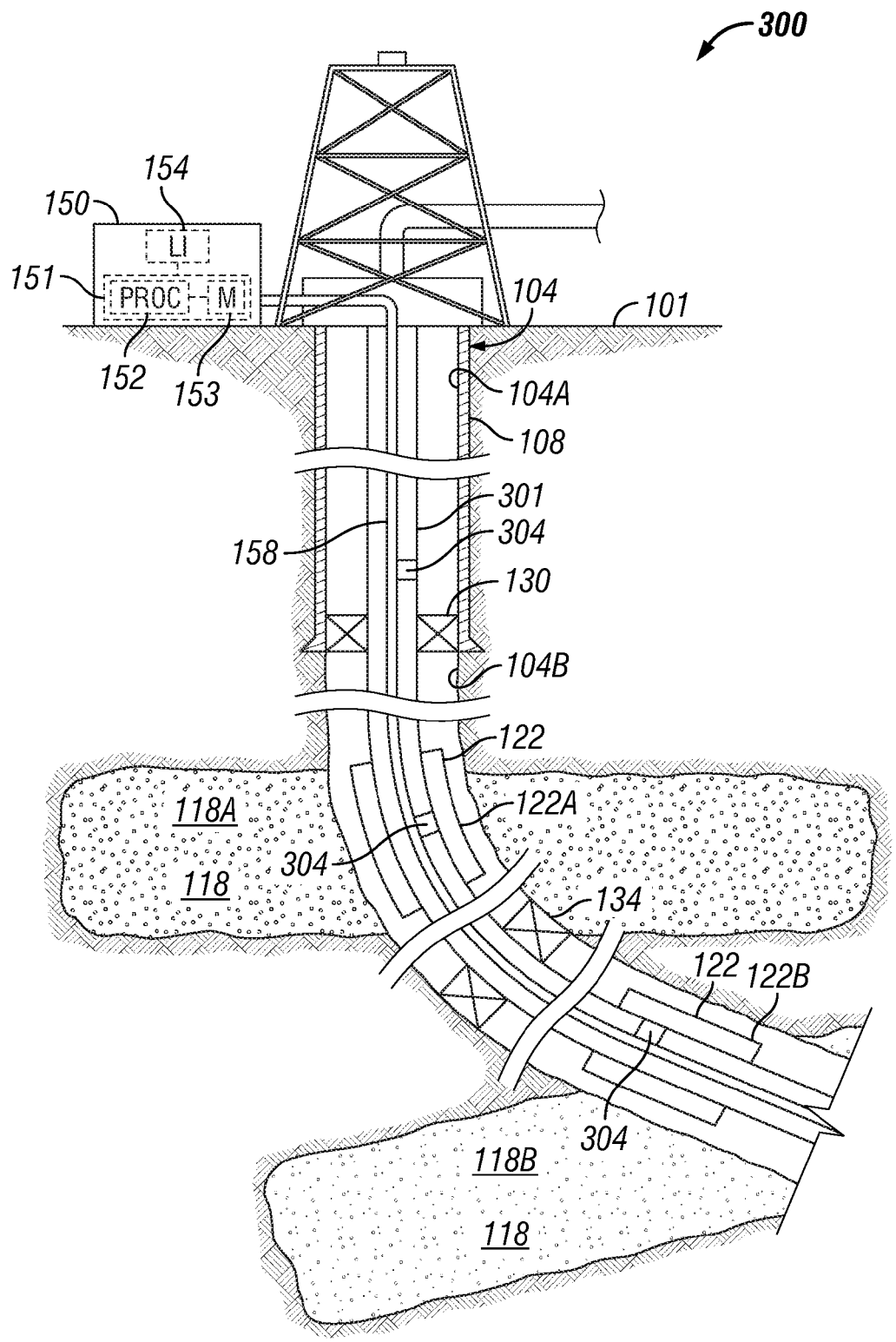

The pressure may be induced by mechanisms other than the wellhead valve 102. For example, FIG. 5 depicts a well 300 in accordance with other embodiments of the invention. The well 300 has a similar design to the well 100, with similar reference numerals being used to denote similar components. However, unlike the well 100, the well 300 includes various flow control devices 304 which are distributed along a production string 301 (replacing the production string 112) and are activated in a way by the controller 151 for purposes of changing the flow rate along the wellbore. These changes provide a pressure change along the wellbore and therefore, induce a distributed temperature transient along the entire wellbore. In other embodiments of the invention, temperature sensors may be disposed along with passive inflow control devices so that a flow measurement may be made downstream of the fluid entry.

Although a distributed flow rate may be determined before the temperature measurements have reached equilibrium, additional information is available once the measurements have reached equilibrium. In this manner, the controller 151 may further apply DTS processing based on measured equilibrium temperatures for purposes of iterating a forward modeling package to find an optimal set of reservoir properties, which match the synthetic data with the measured data.

The heat-transfer coefficient may be viewed as the parallel sum of individual heat-transfer components. For example, there may be fluid movement interior and exterior to the tubing. Or, in some cases, there may be a cement sheath or gravel exterior to the tubing. The heat coefficients for such composites may be computed. For the purposes of flow computation, one of the more important relationships is when there is turbulent flow inside the tubing. In this case the conversion from heat-transfer to flow-rate is straightforward.

For example, the heat transfer coefficient may be described as follows:

$$h = k/D\ Nu, \qquad \text{Eq.1}$$

where "k" represents the thermal conductivity; "D" represents the hydraulic diameter and "Nu" represents the Nusselt number. The hydraulic diameter of a smooth cylinder is equal to its measured diameter. For more complicated duct profiles the hydraulic diameter can be computed.

The Nu Nusselt number can be related to the Reynolds number (called "Re") as follows:

$$Nu = 0.023\, Re^{0.8}\, Pr^n, \qquad \text{Eq. 2}$$

where "n" represents a coefficient that is, for example, 0.4 when the wall is hotter than the wellbore and 0.3 when the wellbore is hotter than the well; and "Pr" represents the Prandtl number. The Reynolds number may be described as follows:

$$Re = \frac{vD}{\mu A}, \qquad \text{Eq. 3}$$

where "$\mu$" represents the fluid viscosity, and "v" represents the mass flow rate.

The Prandtl number may be described as follows:

$$Pr = C_p \frac{\mu}{K}, \qquad \text{Eq. 4}$$

where "$C_p$" represents the heat capacity at constant pressure.

Other relationships may be used as well. For example, Gnielinksi's correlation may be described as follows:

$$Nu_D = \frac{(f/8)(Re_D - 1000)Pr}{1 + 12.7(f/8)^{1/2}(Pr^{2/3} - 1)}, \qquad \text{Eq. 5}$$

where "$Nu_D$" represents the Nusselt number for a tube of diameter D; "f" represents the friction factor along the tubing; "Pr" represents the Pradntl number; and "$Re_D$" represents the Reynold's number for the flow in the tube. This correlation is valid for Pr>0.5 and Re>3000 and so has broad applicability to hydrocarbon modeling in reservoirs. The friction factor may be obtained from a Moody diagram. Note that the derivation of flow rate becomes a nonlinear process, because the friction factor is also dependent on flow-rate. Solutions of that nonlinear equation can be done by standard techniques such as Newton's method.

Figure 3:
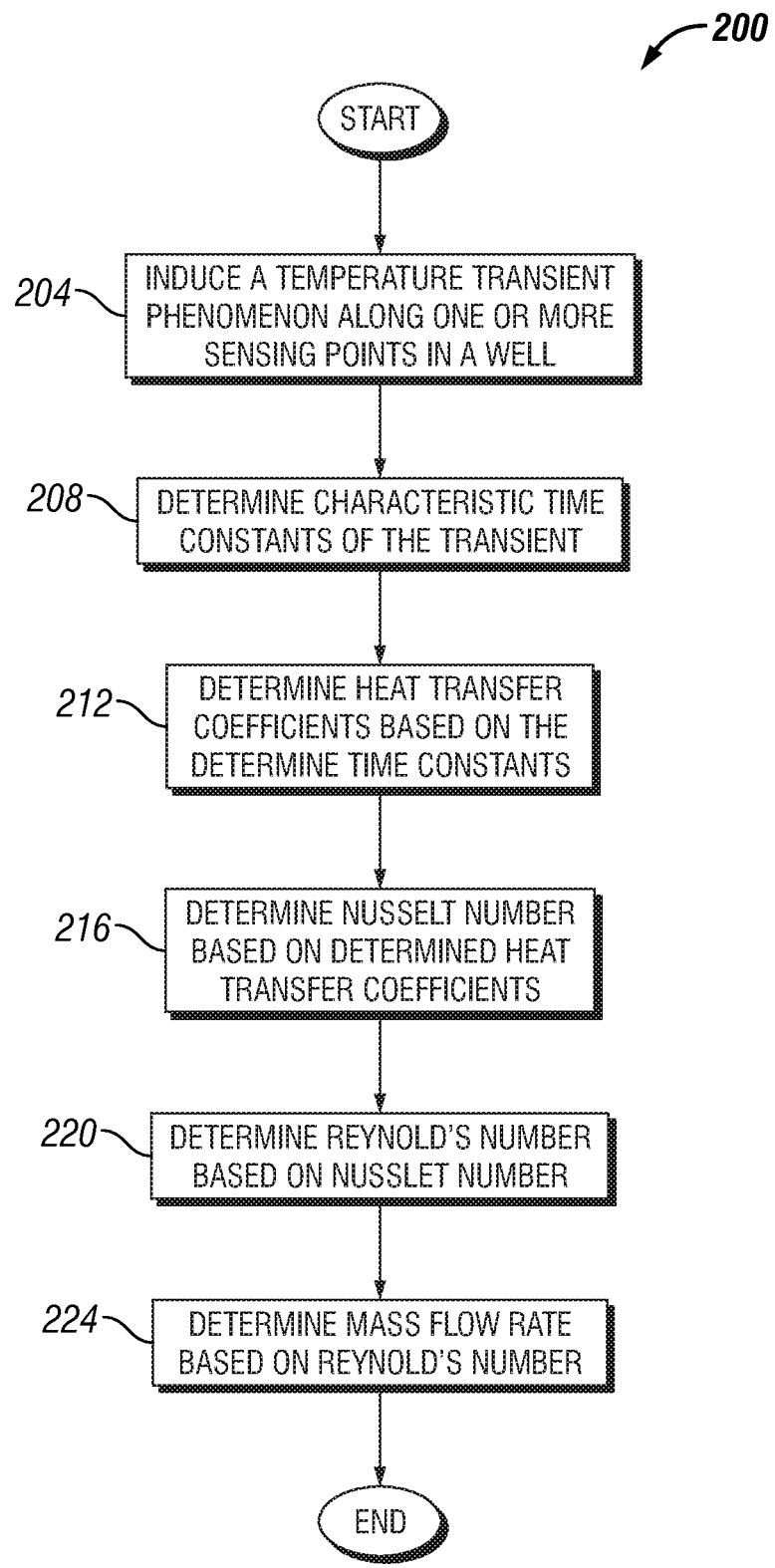

Thus, referring to FIG. 3, to summarize, the controller 151 may perform a technique 200 that is set forth in FIG. 3 for purposes of determining a distributed flow rate, in accordance with some embodiments of the invention. Pursuant to the technique 200, the controller 151 induces a temperature transient phenomenon on one or more sensors that are deployed along the sandface, pursuant to block 204. For example, the controller 151 may actuate the wellhead valve 102 or one or more downhole flow control valves. Next, based on the observed temperature measurements, the controller 151 calculates the characteristic time constants of the temperature transient, pursuant to block 208. The controller 151 next uses (block 212) the time constants to derive associated heat transfer coefficients and determines (block 216) the Nusselt number, which relates convective to conductive heat losses based on the heat transfer coefficients. The controller 151 further determines (block 220) the Reynold's number based on the determine Nusselt number and then determines (block 224) the mass flow rate based on the Reynold's number.

Other embodiments are contemplated and are within the scope of the appended claims. For example, a system to construct a virtual flowmeter in accordance with other embodiments of the invention includes a combination of distributed temperatures sensors, a surface modeling package and downhole flow control devices. In these embodiments of the invention, flow control devices are activated in such a way as to change the flow along the wellbore. The change in flow provides a pressure change along the wellbore and so induces a distributed temperature transient along the entire wellbore. In other embodiments of the invention, the system includes temperature sensors along with passive inflow control devices so that a flow measurement can be made downstream of the fluid entry.

Additional information is available after the sensors have reached equilibrium, because then traditional DTS processing may be more applicable. This processing may be enhanced through the use of an interpretation workstation. The workstation enables the iteration of a forward modeling package to find an optimal set of reservoir properties thereby matching synthetic (or modeled) data with measured (or actual) data. This data may be combined by stabilizing the inversion for flow-rate using standard depth-based approaches.

In some scenarios, there may be a flow that is exterior to the string, e.g., along the annulus between string 112 and reservoir. In this scenario, there is heat transfer from inside and outside the string 112. This flow may be enhanced for purposes of reading the corresponding temperature transients through the use of dedicated components along the completion with an increased surface area on the side desired for maximum sensitivity to flow.

In yet other embodiments of the invention, temperature measurements may be made at discrete time-intervals during the production of the reservoir. In such a scenario, it may be appropriate to consider that the conductive components of heat-transfer have not changed, in which case the remaining parameters to be adjusted would be the fluid properties (oil, water, etc) or the reservoir properties. Integration with a reservoir modeling code may be one of the more optimal ways forward in that scenario. In some scenarios, it may be important to consider that heat-transfer coefficients are changing in a manner unrelated to flow, for example, if there is paraffin deposition in the vicinity of the temperature sensing. In this case, taking a multiplicity of flow-rates can be used to resolve the uncertainty.

Pressure measurements may also be made at the toe and heel of the well to further stabilize the inversion. It is anticipated that a pressure loss is roughly proportional to the square of the fluid velocity. Because the flow is iso-enthalpic, this means that there will be corresponding temperature changes due to the Joule-Thompson process. The relationship between a change in pressure and a change in temperature is indicative of the fluid type (e.g. water cut). Knowledge of the water cut may be used to refine the coefficients used for the empirical relationships between heat-transfer, Nusselt number and Reynolds's number.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   controlling a flow device through which production fluid flows to induce a distributed temperature change along a portion of a wellbore;

measuring a time varying temperature along the portion of the wellbore due to the inducing; and determining a distributed flow rate in the portion based at least in part on the measured time varying temperature before the temperature reaches equilibrium.

2. The method of claim 1, wherein the measuring comprises receiving data from an array of sensors provided along the portion of the wellbore.

3. The method of claim 1, wherein the measuring comprises receiving data from a distributed temperature sensor disposed along the portion of the wellbore.

4. The method of claim 1, wherein the determining comprises modeling the temperature as an exponential function characterized by a time constant, determining the time constant and determining the flow rate based at least in part on the time constant.

5. The method of claim 4, further comprising applying a linear approximation to determine a relationship between the time constant and the distributed flow rate.

6. The method of claim 1, wherein the act of determining the distributed flow rate comprises:
determining time constants of the temperature; and
determining heat transfer coefficients based at least in part on the determined time constants.

7. The method of claim 6, wherein the act of determining the distributed flow rate further comprises: determining a Nusselt number for a ratio of convective to conductive heat loss based at least in part on the determined heat transfer coefficients.

8. The method of claim 7, further comprising: determining a Reynold's number based at least in part on the Nusselt number.

9. The method of claim 8, wherein the act of determining the distributed flow rate further comprises: determining a mass flow rate based at least in part on the Reynold's number.

10. The method of claim 1, wherein the act of determining the distributed flow rate comprises: determining a Nusselt number for a ratio of convective to conductive heat loss.

11. The method of claim 1, wherein the act of determining the distributed flow rate comprises determining a Reynold's number.

12. The method of claim 1, wherein a flow associated with the distributed flow comprises a turbulent flow.

13. The method of claim 1, wherein a flow associated with the distributed flow rate is present in a production tubing, another flow is present in an annulus exterior to the production tubing, and the act of determining the distributed flow rate is based at least in part on the flow in the production tubing and the flow in the annulus.

14. The method of claim 1, wherein a flow associated with the distributed flow rate has a time varying pressure drop induced by a time varying flow rate.

15. The method of claim 14, wherein the pressure drop induces a change in temperature in the well due to an isoenthalpic process.

16. The method of claim 1, wherein the act of determining the distributed flow rate is performed at intervals of time of hydrocarbon production and the act of determining the distributed flow rate is based at least in part on a reservoir model, the method further comprising: refining the reservoir model based at least in part on a determination of the flow rate at the intervals.

17. A method comprising:
changing a wellhead pressure to induce a distributed temperature along a portion of a wellbore;
measuring a time varying temperature along the portion of the wellbore due to the inducing; and
determining a distributed flow rate in the portion based at least in part on the measured time varying temperature before the temperature reaches equilibrium.

18. A system comprising:
a pressure-changing device through which production fluid flows, wherein the pressure-changing device is configured to induce a temperature change;
a distributed temperature sensing system to measure a distributed temperature along at least a portion of a wellbore; and
a processing system configured to:
receive data from the distributed temperature sensor indicative of a time varying temperature along the portion of the wellbore due to the induced distributed temperature change;
determine a distributed flow rate in the portion based at least in part on the time varying temperature before the time varying temperature has reached equilibrium;
model the temperature as an exponential function characterized by at least one time constant;
determine the time constant; and
determine the distributed flow rate based at least in part on the determined time constant.

19. The system of claim 18, wherein the pressure changing device comprises at least one of a wellhead-disposed valve or a downhole flow device.

20. The system of claim 18, wherein the processing system is adapted to:
determine time constants of the temperature; and
determine heat transfer coefficients based at least in part on the determined time constants.

21. The system of claim 20, wherein the processing system is adapted to:
determine a Nusselt number for a ratio of convective to conductive heat loss based at least in part on the determined heat transfer coefficients.

22. The system of claim 21, wherein the processing system is adapted to:
determine a Reynold's number based at least in part on the Nusselt number.

23. The system of claim 22, wherein the processing system is adapted to:
determine a mass flow rate based at least in part on the Reynold's number.

24. The system of claim 18, wherein the processing system is adapted to:
determine a Nusselt number for a ratio of convective to conductive heat loss.

25. The system of claim 18, wherein the processing system is adapted to:
determine a mass flow rate based at least in part on the Reynold's number.

* * * * *